United States Patent [19]

Wood

[11] 4,159,151
[45] Jun. 26, 1979

[54] SILO FILLING APPARATUS

[75] Inventor: Jonathan G. M. Wood, Chiddingfold, Near Godalming, England

[73] Assignee: DeMuth Steel Products Company, Chicago, Ill.

[21] Appl. No.: 860,608

[22] Filed: Dec. 14, 1977

[51] Int. Cl.² .................. B65G 53/40; B65G 53/60
[52] U.S. Cl. .................................. 406/162; 55/337; 55/459 A; 406/171; 406/173
[58] Field of Search ............................ 302/59, 60, 61; 214/17 CB; 55/337, 459 R, 459 A; 209/254

[56] References Cited

U.S. PATENT DOCUMENTS

| | | | |
|---|---|---|---|
| 1,772,881 | 8/1930 | Tolman | 302/59 |
| 2,474,205 | 6/1949 | Welty | 302/59 |
| 2,890,081 | 6/1959 | Terrett | 302/59 |
| 3,501,014 | 3/1970 | Fitch et al. | 55/459 A X |

Primary Examiner—Robert B. Reeves
Assistant Examiner—James L. Rowland
Attorney, Agent, or Firm—Mason, Kolehmainen, Rathburn & Wyss

[57] ABSTRACT

An overhead silo filling device for uniformly distributing ensilage and particulate materials in substantially symmetrical concentric fashion around a central axis of silos and the like comprises a hollow chamber with a discharge outlet at the lower end and adapted to be centered above the surface of the material in the silo. The chamber is supported in an opening in the silo roof structure and includes an upper section, an inwardly and downwardly sloping frusto-conical intermediate section and a lower discharge section which forms the discharge outlet for dispensing silage at the lower end. A material inlet conduit is secured to the upper section of the chamber for directing an inflow of material against an inside wall surface, and the inlet conduit slopes upwardly away from the upper section so that the material is directed downwardly into the chamber to form a downwardly spiralling path inside the chamber wall moving toward the discharge outlet. Air vent means is provided for exhausting air from the chamber to the atmosphere and a valve is provided to open and close for controlling the flow of air and/or material between the discharge outlet and the interior of the silo, and to seal the silo at the upper end from the external atmosphere.

13 Claims, 6 Drawing Figures

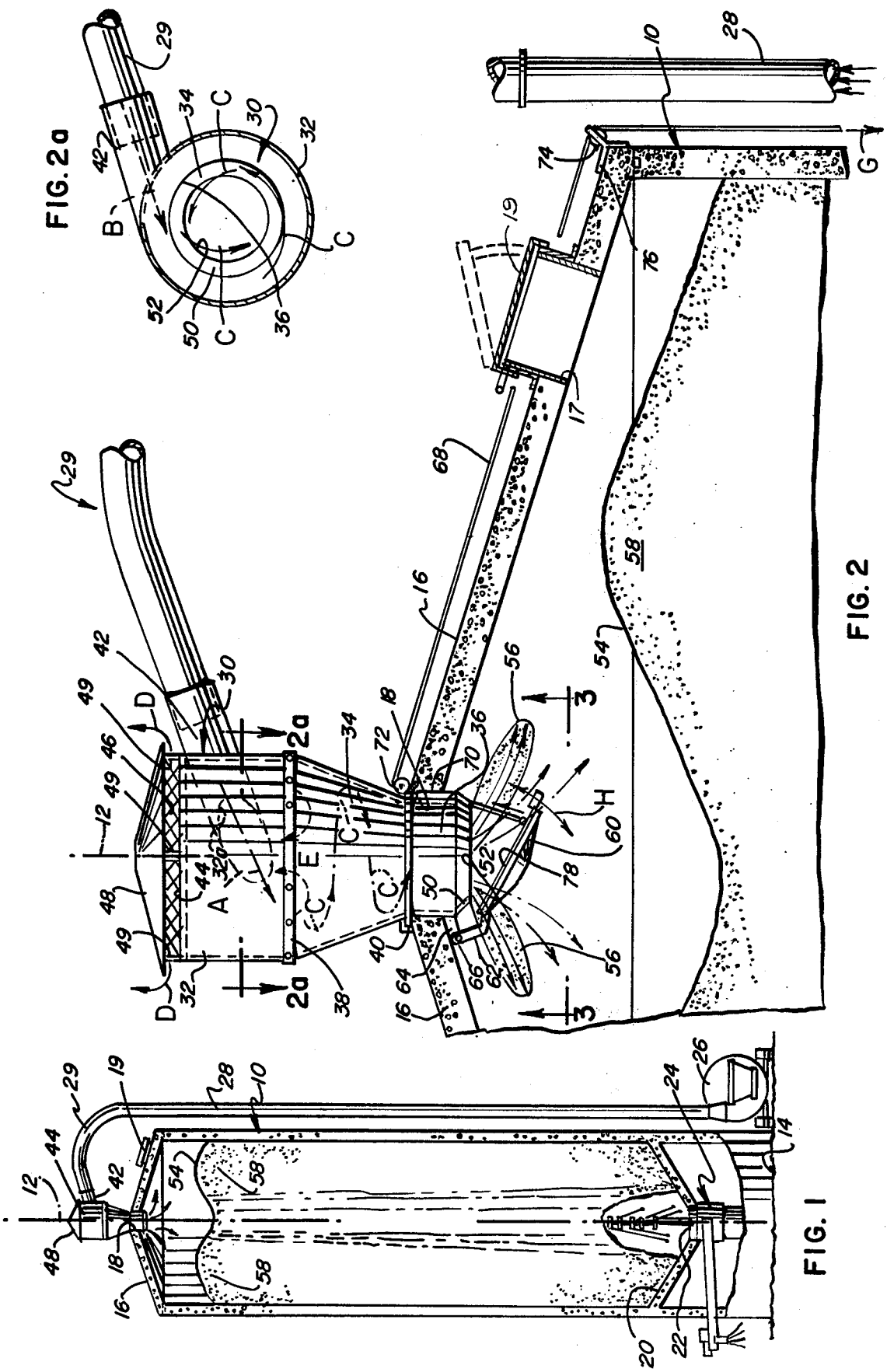

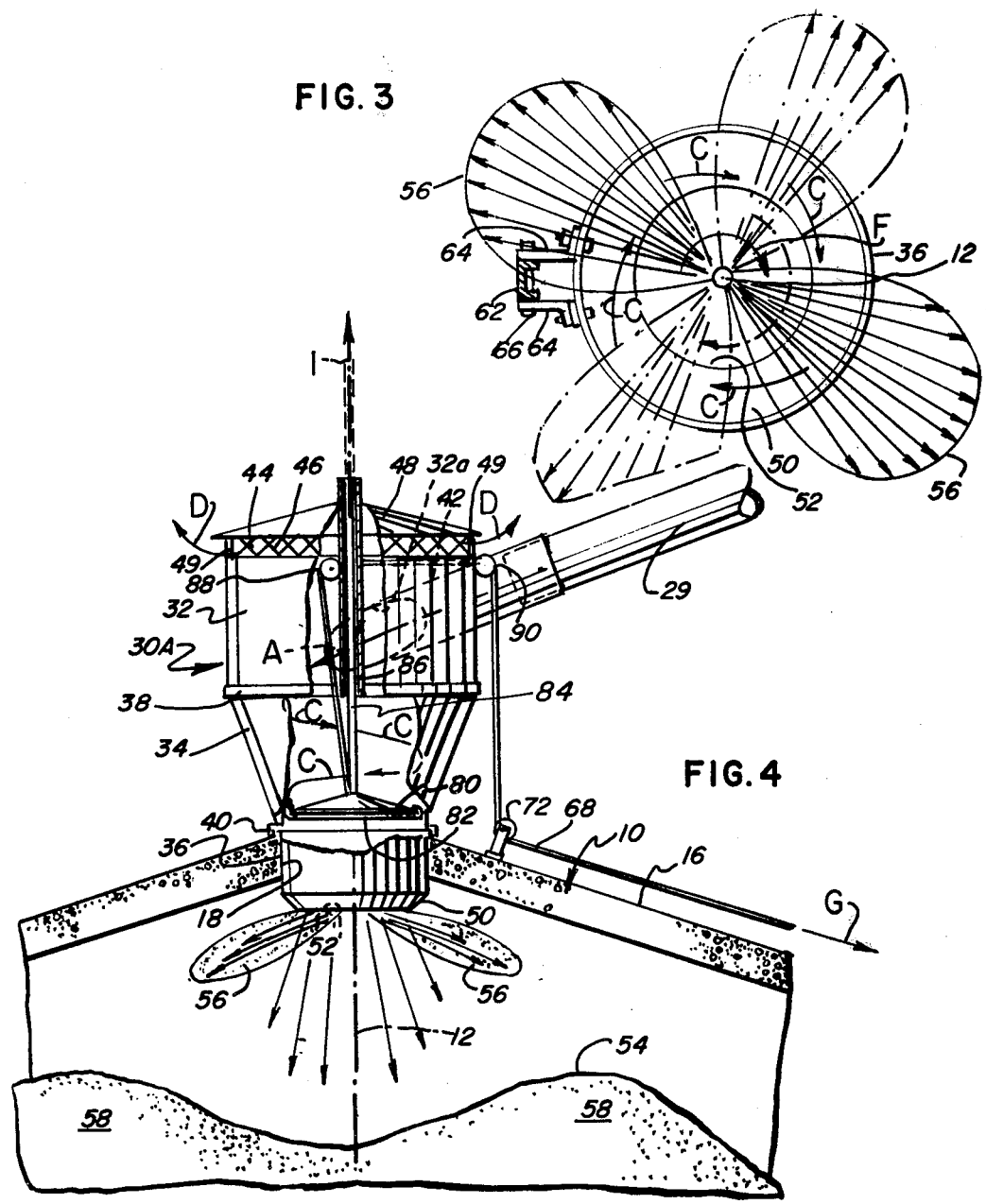
FIG. 3
FIG. 4
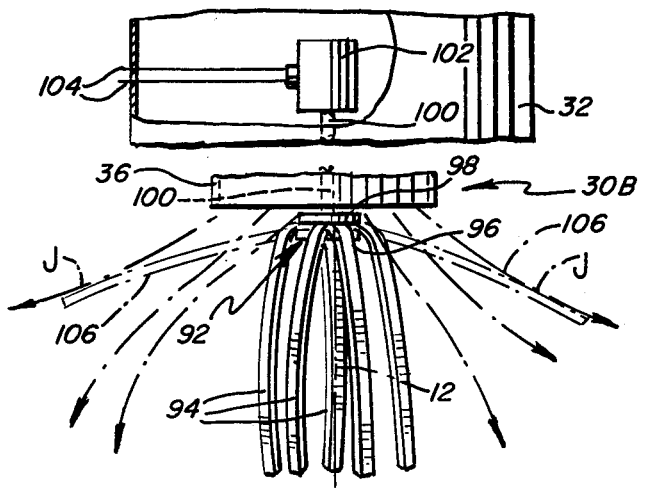
FIG. 5

SILO FILLING APPARATUS

BACKGROUND OF THE INVENTION

1. Field of the Invention

The present invention relates to a new and improved silo filling apparatus and more particularly to an overhead silo filling device designed to promote the uniform distribution of material into the interior of the silo structure in a substantially symmetrical fashion concentric of a central axis therein. Agricultural and industrial silos for storage of ensilage and other types of particulate materials are generally cylindrical and rather tall upright cylindrical structures which are normally filled from a point adjacent from the upper end or roof structure. The material is carried upwardly to the filling level by means of a forage blower and conduit. It is important that the silage material be distributed in a substantially even and uniform manner in a substantially symmetrical concentric fashion over the entire cross-section of the silo interior in order to reduce the possibility of off center loading and subsequent silo wall failure. It is also desirable to distribute the material in a concentric pattern substantially even or uniform over the cross-section of the silo interior so that sections or cores of denser material are not formed, or if they are present, these more dense areas are formed concentrically with respect to a central vertical axis of the silo structure.

2. Description of the Prior Art

A variety of devices have been developed for filling agricultural silos, grain storage binds and other storage vessels, tanks and the like, from the upper end thereof. Most commonly, agricultural silos are filled by means of forage blowers which are located at the ground level adjacent the silo structure to receive the material which is then elevated by means of a flowing air stream which is contained in an upwardly extending flow conduit. Adjacent the upper end of the silo, the conduit is formed with a curved portion or gooseneck to direct the material downwardly and inwardly towards the central portion of the silo interior. In most situations, the material is not uniformly distributed over the cross-section of the interior of the silo because of the unidirectional aspect of the stream discharged from the gooseneck. This causes the silage to collect in a non-symmetrical, non-concentric fashion and form hard or more dense cores of material which cores are generally offset or eccentric with respect to the central axis of the silo. This in turn, results in uneven structural loading of the silo wall structure and sometimes results in wall failure or in extreme cases, tipping over of the silo structure. In addition, when it is desired to unload material from the interior of the silo structure with various types of unloading devices either at the upper level of the material in the vessel or at the bottom of the silo structure, extreme difficulty is encountered when eccentric cores of hardened or more dense silage material are present. Unloading devices generally have a mechanism which rotates around a central axis of the silo structure and this mechanism encounters considerable difficulty when hardened cores of silage material are present at locations which are not symmetric with respect to the central axis of the silo. In addition, the gooseneck type silo discharge devices presently in use do not provide for evacuating or exhausting from the silo the large volumes of air that are pumped into the silo by the forage blowers and the presence of this air is undesirable in that excess oxygen may initiate chemical reactions in the silage material and may cause a reduction in the food value of the ensilage material.

The U.S. Pat. No. 3,298,748 discloses a silo filling device employing a power driven motor for aiding in the distribution of the silage material around the central portion of the silo interior as the material is received from a gooseneck type delivery chute overhead. This device is adapted for use on open top silos and provides no means for exhausting of excess air when a closed roof structure is present. The U.S. Pat. No. 3,720,316 discloses a flow controller for a material separator used for distributing material over the surface of a screen, and the U.S. Pat. No. 3,737,074 discloses an apparatus for feeding particulate material such as plastic granules and the like wherein the material is blown into a distribution device on a stream of air with a jet pump being provided to exhaust the excess air from the feeding device.

It is an object of the present invention to provide a new and improved overhead silo filling apparatus of the character described and more particularly to provide an overhead silo filling device which more uniformly distributes silage material over the entire interior surface area of the stored material in a storage silo.

Another object of the present invention is to provide a new and improved silo filling device which does not introduce large volumes of air or excess oxygen into the interior of the silo as it is filled.

Another object of the present invention is to provide a new and improved overhead filling device which provides for a substantially uniform density distribution of the material around substantially the entire area of the silo interior.

Yet another object of the present invention is to provide a new and improved filling device for discharging material into a storage vessel in a concentric fashion around a central axis of the vessel.

Another object of the present invention is to provide a new and improved device of the character described in the preceding object which is capable of distributing the material in a substantially symmetrical basis around the central axis of the vessel.

Yet another object of the present invention is to provide a new and improved overhead silo filling device in which the silage material does not tend to form dense cores or hard shafts which are positioned eccentric of the central axis of the storage silo.

Yet another object of the present invention is to provide a new and improved overhead silo filling device of the character described which is adapted to be mounted at a central location of the existing roof structure of a silo, yet which is readily controlled from ground level.

Another object of the present invention is to provide a new and improved overhead silo filling device with a novel control valve which may be opened and sealingly closed to seal the interior contents of the silo structure from contact with the outside atmosphere.

Another object of the present invention is to provide a new and improved silo filling device which distributes the silage material in a substantial symmetrical manner so that silo unloading from eiher the upper surface or the lower level of the silo is greatly enhanced.

Yet another object of the present invention is to provide a new and improved overhead silo filling device of the character described which is relatively simple in operation, economical to construct and install in a silo and easy to use and control from the ground level.

Yet another object of the present invention is to provide a new and improved silo filling device including a rotating silage distributing element.

SUMMARY OF THE INVENTION

The foregoing and other objects and advantages of the present invention are accomplished in an illustrated embodiment herein which comprises an overhead silo filling device designed for more uniformly distributing material such as ensilage into the interior of an upstanding silo or storage vessel. The overhead silo filling device includes a hollow chamber having a discharge outlet at the lower end and is adapted to be centrally positioned or mounted in the silo above the surface of the silage material on the roof or cover structure. The chamber includes an upper section, an inwardly and downwardly sloping frustro-conical intermediate section and a lower discharge section which forms the discharge outlet at the lower end. A material inlet conduit adapted to receive material from a forage blower positioned at ground level via a supply conduit is arranged to direct the incoming material tangentially inwardly of the chamber toward the inside surface of the upper section so that the material will spin or spiral downwardly around the interior of the hollow chamber. The inlet conduit slopes upwardly away from the upper section of the hollow chamber so that the incoming material is directed into the chamber to flow in a downwardly concentric spiralling path around the chamber wall surface toward the discharge outlet. Air vent means is provided so that air flowing into the chamber via the inlet conduit passes upwardly and outwardly into the atmosphere rather than downwardly through the discharge outlet into the material in the interior of the silo. A sealing valve operable to open and close for controlling the flow of air and/or material between the discharge outlet and the interior of the silo is provided and the valve is controllable from ground level to seal the upper end of the silo when desired after silo filling or withdrawal of the material.

BRIEF DESCRIPTION OF THE DRAWINGS

For a better understanding of the invention, reference should be had to the following detailed description taken in conjunction with the drawings, in which:

FIG. 1 is a vertical sectional view illustrating a typical agricultural silo or grain bin having a new and improved overhead silo filling device constructed in accordance with the features of the present invention installed therein;

FIG. 2 is an enlarged, fragmentary, sectional view similar to FIG. 1 but illustrating in greater detail one embodiment of an overhead silo filling device constructed in accordance with the features of the present invention;

FIG. 2a is a horizontal, sectional view taken substantially along lines 2a—2a of FIG. 2;

FIG. 3 is a fragmentary, horizontal, sectional view taken substantially along lines 3—3 of FIG. 2 and illustrating in somewhat animated fashion a discharge pattern of the material as it flows from the silo filling device into the interior of the silo for storage;

FIG. 4 is a fragmentary, sectional view similar to FIG. 2 but illustrating another embodiment of a silo filling device constructed in accordance with the features of the present invention; and FIG. 5 is a fragmentary, sectional view illustrating a lower end portion of yet another embodiment of a silo filling device constructed in accordance with the features of the present invention.

DESCRIPTION OF THE PREFERRED EMBODIMENTS

Referring now more particularly to the drawings, in FIG. 1 is illustrated an agricultural silo or storage vessel 10 which is generally cylindrical in shape and which extends upwardly in a generally vertical direction in symmetry about a vertical central axis 12 above a supporting ground or earth surface 14. Silos or tanks of this general type are available in a wide variety of sizes and it is not uncommon for silos and storages tanks, grain bins and the like to reach heights of 200–300 feet with diameters ranging from 10–100 feet depending upon the particular locale and the facility required. While the silo 10 is illustrated as having a concrete wall structure, other types of wall structures of material such as steel, or wood and other materials may be used.

The silo is adapted to be air sealed at both ends and at the upper end includes a frustro-conical roof structure 16 having a centrally disposed, circular filling opening 18 concentrically aligned with the vertical center axis 12. At the lower end, the silo is formed with a frusto-conical bottom or hopper type wall 20 having a circular discharge opening 32 in which is mounted a flail type bottom silo unloader 24 such as that shown in U.S. Pats. Nos. 3,942,656 and 3,907,131. The roof structure is formed with one or more access manholes 17, each having a cover or hatch 19 which may be pivoted to an open position (dotted lines) to permit access to the silo and to vent the interior to the atmosphere when desired, as will be described hereinafter.

The generally cylindrical hollow interior of the silo 10 is adapted to hold a large quantity of ensilage material, fodder, grasses, grains or almost any other type of particulate material including cement, coal, fertilizer, etc. In most agricultural cycles of operation, the material is introduced into the silo as it is harvested for a storage period until the material is ready for use. The silage material is introduced into the upper end of the silo structure through the roof structure filling opening 18 and in the embodiment ilustrated, when the grain or ensilage material is utilized for cattle feeding or the like, the material is removed through the bottom discharge opening 22 by the flail type bottom unloader 24. Other types of silo top or bottom surface unloaders could also be provided. As the bottom unloading is carried out, the material in the silo slowly slips downwardly in the wall structure. Reference to the above-mentioned silage unloader patents should be had to better understand the process of unloading the material that has been stored in the silo structure. It is desirable that both the upper and lower ends of the silo container be sealed from the external atmosphere at all times when material is not being loaded into or unloaded from the storage capacity.

For the purpose of introducing new material into the silo, there is provided a forage blower 26 at the ground level 14 and this forage blower is adapted to receive the particulate material or silage to be stored and blow the material upwardly through a generally vertical feed conduit 28 having an arcuately curved gooseneck section 29 adjacent the upper end which is adpated to deliver the material in a rapidly flowing stream into an overhead silo filling apparatus 30 constructed in accordance wih the features of the present invention.

The silo filling device 30 includes a hollow chamber concentrically aligned about the center axis 12 of the silo 10 and is formed with a generally cylindrical, upper section 32 which is joined at its lower end to an inwardly and downwardly sloping, frustro-conically tapered intermediate section 34. At the lower end, the intermediate section is joined to a generally cylindrical lower discharge section 36. The upper section and the intermediate section are interconnected by means of a circular joint ring 38 and the intermediate section in the lower discharge sections are in turn interconnected by a flanged, circular mounting ring 40 which is used to support the silo filling device 30 in concentric position on the silo roof 16 aligned with the center axis 12 thereof.

A high velocity flow of silage or other particulate material is directed into the interior of the hollow chamber of the filling device via a tangential, inlet boot 42 which includes an inner end secured around an elliptically shaped opening 32a formed in the side wall of the upper section 32. As best shown in FIGS. 2 and 2a, the inlet boot 42 is arranged to extend tangentially outward from and slope upwardly from the opening 32a in the cylindrical wall of the upper segment 32 of the device 30. Accordingly, the incoming material flows downwardly and is centrifuged outwardly against the inside surfaces of the several sections of the hollow chamber as shown by the arrows "A" and "B" in FIGS. 2, 2a and 4. The material is flowing at a relatively high velocity and is directed by the boot 42 and wall surface to move in a downwardly spiralling path as indicated by the arrows "C" towards the discharge section 32 at the lower end. Because of the downward slope of the incoming material, as indicated by the arrows, "A" there is no interference between the material in the chamber that is already spiralling around the inside surface and the fresh, incoming material passing through the ellipitical opening 32a. Accordingly, the silage material moves rapidly downwardly in a descending concentric spiral toward the lower end section 36 and the high velocity at the level of input is reduced rapidly.

The thin, swiftly flowing stream of material first entering the chamber at the upper level through the inlet opening 32a is slowed down by frictional contact against the inside surfaces of the chamber sections 32, 34 and 36 and as the material slows down, the air introduced by the forage blower tends to turn upwardly in the central or core portion of the hollow chamber. This excess air is normally vented outwardly to the atmosphere through an upper, annular exhaust opening or slot above the upper edge of the wall section of the upper chamber section 32. As illustrated in FIGS. 2 and 4, the annular, air exhaust opening or slot 44 is covered by an annularly shaped grill 46 and the upper end of the chamber is closed with a conically shaped dome or roof 48 supported at its lower edge by a plurality of circumferentially spaced apart upstanding support legs 49 (FIGS. 2 and 4). The air which reaches the level of the annular air outlet opening 44 passes freely outward into the atmosphere as indicated by the arrows "D" and thus does not flow downwardly into the interior of the silo 10.

With some types of material (for example, wet grain) it may be desirable to direct the incoming air stream downwardly into the mass of material in the silo for additional drying action and in this case, the grill covered exhaust opening 44 may be covered over and sealed off by a sheet metal band (not shown). The roof vent covers 19 may be opened (dotted lines, FIG. 2) to exhaust moisture laden air from the silo in this type of operation.

The frustro-conically shaped intermediate section 34 of the hollow chamber facilitates a rapid slow down of the swirling material traveling in the downward spiral concentric path around the inside surface of the chamber wall section. A slope of the wall of the intermediate section 34 of approximately 70° has proved to be highly effective in operation. The excess air in the silage material tends to separate and flow upwardly in the central interior or core portion of the hollow chamber as indicated by the arrows "E" and this air is eventually exhausted rapidly outwardly to the atmosphere via the uncovered annular exhaust opening 44 adjacent the upper end portion of the upper chamber section 32.

In accordance with a feature of the present invention, the lower, generally cylindrical discharge section 36 of the silo filling device is formed with a shallow frustro-conically shaped inwardly tapered, lower lip 50 at the lower edge of the cylindrical wall. This lip defines a circular discharge opening 52 at the bottom of the hollow chamber for the material to be discharged into the interior of the silo over the upper surface 54 of the material.

The lower discharge cone 50 is provided with a relatively shallow angle of slope in the order of approximately 45° and it has been found that this sloping conical surface in combination with the downward concentric spiral path of the flowing material results in the formation of fan-like distribution patterns 56 (FIG. 3) dispensing the material radially and downwardly outward in a concentric fashion from the circular discharge opening 52. The fan-like patterns dispense material substantially uniformly in a concentric distribution to generally cover a substantial portion of the entire cross-sectional area of the upper surface of the material contained in the silo structure.

It has been found that a pair of fan-like patterns of material discharge are formed and extend radially outward in opposite directions from the central axis 12. The fan-like patterns of discharging material swirl or rotate around the central axis of the discharge opening during a silo filling operation as indicated by the arrows "F" in FIG. 3 and this results in a substantially uniform density distribution of the material in a concentric fashion over the upper surface of material already in the silo. The fan-like patterns of discharging material tend to spread the material radially outwardly over a relatively large area in a symmetrical, concentric and substantially uniform pattern over a major portion of the cross-section area of the silo vessel.

It is believed that the inwardly and downwardly sloping wall of the lower discharge cone section 50 causes the fan-like spray patterns 56 to develop and these patterns are clearly visible during a normal silo filling operation. In addition, there is less tendency of material to pack and form hard, core-like areas of more dense material than in prior art feeding devices. However, even when there are variations in the densities of the material deposited over the silage surface as indicated by the humped regions 58 (FIGS. 1, 2 and 4), these variations are symmetrical or concentric rings with respect to the central axis 12 of the silo and thus cause only minimal problems in subsequent unloading of the material. With prior art silo filling devices, hardened cores of more dense material are often formed on an eccentric and/or erratic basis and these core areas (for example, on one side of a silo wall) cause difficulty when the material is to be unloaded either with a top unloader device or with a bottom unloader.

In accordance with another feature of the present invention, the silo filling device 30 is provided with a circular shaped sealing valve 60 supported from one edge on a bracket 62 which is pivotally connected to a pair of arms 64 by a pivot bolt 66. The arms 64 in turn are bolted or otherwise attached to the outer surface of the lower cylindrical discharge section 36 as best shown in FIGS. 2 and 3. Movement of the frustro-conical sealing valve is controlled from ground level by a cable 68 which is attached to the edge of the valve at a point diametrically opposite the supporting btrackets 62. The cable 68 extends upwardly through a guide tube 70 and over a pulley or sheave 72 on the roof structure 16. Another guide sheave or pulley 74 is supported on a bracket 76 at the edge of the roof so that the valve can be opened and closed by downward pull on the cable 68 at ground level as indicated by the arrows "G" (FIG. 2).

The upper surface of the valve 60 is provided with a sealing gasket 78 of rubber or other resilient material and this gasket is adapted to seal against the lower edge of the conical discharge section 50 around the discharge opening 52. When the valve is closed by a downward pull on the cable 68, the valve 60 and the sealing gasket 78 provide an air seal at the lower end of the silo filling device 30 and seal off the material contained in the silo 10 from the external atmosphere.

When it is desired to fill the silo with additional material or when unloading operations are in progress, the valve 60 may be opened by releasing the cable 68 which permits the valve to pivot (as illustrated by the arrows "H") downwardly from a horizontal sealing position to a generally vertical, open position offset from the discharge opening 52 so as not to interfere with the distribution pattern of the silage as it is directed outwardly and downwardly into the interior of the silo vessel.

Referring now to FIG. 4, therein is illustrated another embodiment of a silo filling apparatus 30A adapted to provide overhead feeding of material into an agricultural silo, storage bin, tank or vessel. The silo filling apparatus 30A is similar in most respects to the previously described embodiment and only the differences will be hereinafter described in detail. The device of FIG. 4 is provided with a circular, internally mounted valve of conical shape generally indicated by the reference numeral 80. The valve is provided with a sealing gasket 82 around its periphery adapted to seal against the interior adjacent surface of the frustro-conical intermediate section 34 of the hollow chamber. The valve is supported on a vertical rod 84 which is concentrically aligned with the axis 12 of the silo and is mounted for vertical sliding movement in a hollow sleeve 86 supported from the upper and intermediate chamber sections 32 and 34. The sleeve projects upwardly through an opening in the conical roof structure 48 and movement of the valve 80 is controlled by the cable 68 which is attached to a point on the upper surface of the valve adjacent the center. The cable extends upwardly and over a pulley or sheave 88 mounted inside the hollow chamber at an upper level and then is directed outwardly to pass around an external pulley or sheave 90 mounted on the outer surface of the upper chamber segment 32 adjacent the annular, air exhaust opening 44.

In order to open the valve 80, the cable 68 is pulled downwardly at ground level as in the previous embodiment. Pull on the cable lifts the valve 80 upwardly in the chamber to an open position out of sealing engagement with the inside surface of the frustro-conical, intermediate wall section 34. When the valve is opened the flow of material spirals downwardly around the inside wall surfaces of the hollow chamber towards the discharge opening as in the prior embodiment and the valve helps to direct air flow upwardly toward the exhaust opening 44.

The valve rod 84 is slideable within the hollow sleeve 86 and thus maintains the valve in concentric relation as the valve is moved up and down to open and close as shown by the arrow "I" (FIG. 4). When it is desired to close the valve and again seal the silo against the outside atmosphere, tension on the cable is released and the weight of the valve 80 moves the valve downwardly into a closed position with the gasket around the perimeter 82 in sealing engagement with the adjacent inside wall surface of the frustro-conical intermediate segment 34 at a lower level therein.

Referring now to FIG. 5, therein is illustrated an additional embodiment of a silo filling device indicated by the reference numeral 30B. This device differs from those of the prior embodiments in that it employs a rotating material distribution mechanism adjacent the lower end of the lower discharge section 36. The lower cylindrical discharge section 36 may or may not be provided with a frustro-conical discharge segment 50 as in the prior embodiments. In order to aid in distribution of the material in a concentric pattern extending symmetrically outwardly around the central axis 12, there is provided a rotating distribution mechanism generally indicated by the reference numeral 92. The rotary distributor 92 includes a plurality of flexible, elongated cord-like elements 94 formed of rubber or plastic material. The upper ends of the elements are secured between a pair of circular disks 96 and 98 and are held in place between the disks by clamping bolts or other suitable fasteners. The disks are mounted on the lower end of a vertically aligned rotor shaft 100 which is concentric with the central axis 12 of the silo 10.

Referring to FIG. 5, the rotor shaft 100 is driven by an electric motor 102 which may be mounted at the center of the upper section 32 and the motor is supplied with electrical power through a conduit and wires indicated generally by the reference numeral 104. When the motor 102 is energized, the rotor shaft turns and the relatively limp, elongated flexible elements 94 begin to raise upwardly and swing outwardly because of the centrifugal force of rotation. The general position of these rotary elements is shown in dotted lines (indicated by the reference numerals 106) and as the silage material moving around the outer surface of the discharge chamber 36 passes out the open lower end, the material is engaged by whirling elements 94 which direct the material radially outwardly as indicated by the arrows "J". The dispersal pattern of the material is generally similar to that described in connection with the previous embodiments except that the fan-like patterns are not visible. The rotary action of the relatively limp or flexible elongated elements 94 insures a positive, substantially uniform, outward distribution of the material as it flows downwardly from the lower end of the lower discharge section 36. The motorized spreader 92 is utilized where a greater outward spread of material is required.

From the foregoing it will be seen that the overhead silage filling device in accordance with the present invention is especially well adapted for providing a more uniform, concentric pattern of discharge and a more symmetrical distribution of material over the entire upper surface of the material in the silo. Because of the concentric pattern of uniform distribution, silos and other vessels can be filled to contain a greater weight of material than heretofore possible and this is particularly true with materials such as ensilage and the like which do not tend to be free-flowing. The distribution device insures that eccentric, hardened or more dense cores of silage material do not develop and thus makes silo filling as well as silo unloading a much easier and less troublesome process. In addition, the chance of a silo bursting or tipping over because of uneven loading is virtually eliminated and the novel silo filling device makes possible a good air seal at the upper end of the silo to protect the material that is stored.

Although the present invention has been described with reference to several illustrated embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. An overhead filling device for more uniformly distributing particular materials and ensilage material and the like in a concentric pattern into silos and the like, said device comprising:
   a hollow chamber having a discharge outlet at a lower end adapted to be centered above the surface of said material contained in said silo,
   said chamber including an upper section, an inwardly and downwardly sloping frustro-conical intermediate section and a lower discharge section forming said discharge outlet at a lower end,
   said lower section of said chamber having a generally cylindrical upper portion and a frustro-conical lower discharge portion sloping inwardly and downwardly of said generally cylindrical shaped upper portion and forming said discharge outlet at its lower edge,
   said frustro-conical intermediate section having a relatively steep slope in relation to a relatively shallow slope of said frustro-conical lower portion of said lower discharge section;
   a material inlet conduit secured to extend tangentially outwardly of said upper section for directing an inflow of material against an inside wall surface thereof; and
   said inlet conduit sloping upwardly away from said upper section for direction said material to flow in a concentric downwardly spiralling path around said chamber toward said discharge outlet.

2. The silo filling device of claim 1 including a rotary distributor adjacent said discharge outlet for discharging material downwardly and outwardly of said outlet into said silo.

3. The silo filling device of claim 2 wherein said rotary distributor includes a plurality of elongated flexible elements having inner ends secured to radiate from a centrally disposed rotor.

4. The silo filling device of claim 3 wherein said rotor is mounted on a vertical shaft centered in said discharge outlet and including motor means for rotating said shaft.

5. The silo filling device of claim 4 wherein said motor means is mounted adjacent an upper level of said chamber.

6. The silo filling device of claim 4 wherein said motor means comprises an electric motor supported from said chamber.

7. The silo filling device of claim 1 wherein said relatively steep slope is approximately 70° from a horizontal.

8. The silo filling device of claim 1 wherein said relatively shallow slope is approximately 45° from a horizontal.

9. The silo filling device of claim 1 including air vent means above said material inlet for exhausting air from said chamber.

10. The silo filling device of claim 9 wherein said upper section of said chamber includes a generally cylindrical said wall and a generally conical roof, said air vent means comprising an annular opening around said side wall below said roof.

11. The silo filling device of claim 1 including valve means operable to open and close for controlling the flow of air and/or material between said discharge outlet and said silo.

12. The silo filling device of claim 11 wherein said valve means includes a valve member pivotally secured to said chamber to open away from said discharge outlet and close against the edge thereof.

13. The silo filling device of claim 11 wherein said valve means includes a circular valve member mounted for movement inside said chamber between an upper, open position wherein a circumferential edge is spaced inwardly away from an adjacent inside wall surface of said chamber and a lower, closed position wherein said circumferential edge is sealed against the adjacent inside wall surface of said chamber to prevent flow through said discharge opening between said chamber and said silo.

* * * * *